Patented Oct. 25, 1949

2,485,988

UNITED STATES PATENT OFFICE 2,485,988

β-NITROALKYL ARALKYL ETHERS AND PROCESS FOR PREPARING THEM

Murray Senkus, Terre Haute, Ind., assignor to Commercial Solvents Corporation, Terre Haute, Ind., a corporation of Maryland No Drawing. Application February 25, 1946, Serial No. 650,136

9 Claims. (Cl. 260—611)

My invention relates to new β-nitroalkyl aralkyl ethers and to a novel process for producing same. More particularly, it relates to the production of these new β-nitroalkyl aralkyl ethers by suitably reacting an aliphatic nitro alcohol of the type produced from an aliphatic aldehyde and a nitroalkane with an aralkyl ether or aralkylcarbinol.

The β-nitroalkyl aralkyl ethers of my invention have the following structural formula:

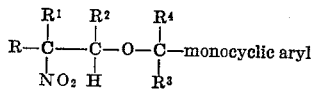

wherein R, R¹, and R² are selected from the group consisting of hydrogen and lower alkyl radicals, and R³ and R⁴ are selected from the group consisting of hydrogen and monocyclic aryl.

As illustrative of some of the compounds coming within the scope of the above formula, there may be mentioned: 2-nitroisobutyl benzhydryl ether, 2-nitroisobutyl benzyl ether, 2-nitroisobutyl triphenylmethyl ether, 2-nitroisopropyl p-methylbenzyl ether, 2-nitro-2-methyl-1-propyl 1-p-tolylbenzyl ether, 2-nitro-1-methylbutyl tri-p-tolylmethyl ether, and the like.

In practicing my new process for the production of my new β-nitroalkyl aralkyl ethers, I heat in the presence of a strong acid catalyst a mixture of an aliphatic nitro alcohol of the type produced from an aliphatic aldehyde and a nitroalkane, a material such as an aralkyl ether or aralkylcarbinol, and an inert liquid forming a binary boiling mixture with water or methyl alcohol. This mixture is heated to reflux temperature and the water or methyl alcohol formed during the reaction removed by distillation. If desired, the inert liquid may be recovered from the distillate and returned to the reaction mixture. This operation is continued until the reaction is completed and the water or methyl alcohol has been completely removed from the reaction mixture. The inert liquid is then removed by distillation or other suitable means and the β-nitroalkyl aralkyl ether recovered by rectification or crystallization or other suitable means, depending upon the physical characteristics of the particular ether being produced.

The nitro alcohols which may be used in my process are any of those which can be produced from aliphatic aldehydes and a nitroalkane by the aid of a base or other suitable catalysts. As illustrative of suitable compounds of this class which may be used in my process, there may be mentioned: 2-nitro-2-methyl-1-propanol, 1-nitro-2-propanol, 2-nitro-2-methyl-3-hexanol, 3-nitro-2-pentanol, and the like.

The nitro alcohol may be reacted with either an aralkyl ether or an aralkylcarbinol of the type represented by the structural formula:

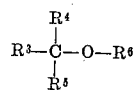

wherein R³ and R⁴ are selected from the group consisting of hydrogen and monocyclic aryl radicals, and R⁶ is a member of the group consisting of hydrogen and methyl. Examples of suitable compounds of this type include: methyl triphenylmethyl ether, benzyl methyl ether, benzhydrol, p-methylbenzyl alcohol, phenyl-p-tolylcarbinol, tri-p-tolylcarbinol, and the like.

As the catalyst for effecting the production of my new β-nitroalkyl aralkyl ethers, I may use any strong acid suitable for effecting etherification reactions such as, for example, p-toluenesulfonic acid, benzenesulfonic acid, sulfuric acid, hydrochloric acid, and the like.

The water or methyl alcohol may be removed from the reaction mixture by the aid of a liquid which is inert under the conditions of the reaction and which forms a binary azeotrope with water boiling below the boiling point of the ether being formed. While not essential, it is preferable that the liquid be substantially water-insoluble so that the inert liquid may be more readily recovered from the water-inert liquid distillate and reused in the process. The use of a water-soluble inert liquid generally requires the use of larger quantities of inert liquid or additional treatment for its recovery in a form suitable for reuse in the process. Examples of suitable materials of this class include: benzene, toluene, cyclohexane, petroleum naphtha, and the like.

As illustrating my new method of producing β-nitroalkyl aralkyl ethers, the following examples are given:

Example 1

A mixture consisting of 100 g. (0.36 mole) of methyl triphenylmethyl ether, 42 g. of 2-nitro-2-methyl-1-propanol (0.35 mole), 250 ml. of benzene, and 0.25 g. of p-toluenesulfonic acid was distilled through a column at a 5:1 reflux ratio until 19 ml. of liquid boiling at 56–58° C. had been obtained. Distillation was continued until 220 ml. of benzene had distilled. The solid residue from this distillation weighed 130 g. The product was purified by crystallization from ethyl ether, analyzed, and found to be 2-nitroisobutyl triphenylmethyl ether having a melting point of 134.0° C.

Example 2

To a one liter round-bottom flask which connected to a condenser was added a mixture of 185 g. (one mole) of benzhydrol, 119 g. (one mole) of 2-nitro-2-methyl-1-propanol, 200 ml. of benzene, and 1 g. of p-toluenesulfonic acid. The mixture was refluxed and after two hours 18 ml. of water had separated from the distillate. To the solution was then added 10 g. of decolorizing charcoal and the mixture heated on a steam bath until the greater portion of the benzene had distilled. To the residue was next added 1000 ml. of ethyl ether and the mixture was filtered. The filtrate was heated on the steam bath to remove the ethyl ether and to the residue was next added 600 ml. of petroleum ether and the resulting solution cooled. Crystals of 2-nitroisobutyl benzhydryl ether immediately separated from the solution. The mixture was filtered and the solid dried. Yield, 270 g. of 2-nitroisobutyl benzhydryl ether having a melting point of 62.5° C.

Example 3

A mixture consisting of 59 g. (0.5 mole) of 2-nitro-2-methyl-1-propanol, 61 g. (0.5 mole) of benzyl methyl ether, 200 ml. of benzene, and 0.5 g. of p-toluenesulfonic acid was distilled through a column until 200 ml. of benzene had distilled. On further heating, methanol commenced to distill and after several hours 16 ml. of methanol was obtained. The residue was dissolved in 500 ml. of ethyl ether and the ether solution was washed with aqueous sodium bicarbonate solution and then with water. Rectification of the ether solution gave 54 g. of 2-nitroisobutyl benzyl ether, having a boiling point of 116–118° C. at 2.5 mm.

The β-nitroalkyl aralkyl ethers of my invention have been found to be useful in the preparation of numerous organic compounds. Other uses of these products will be apparent to those skilled in the art.

My invention now having been described, what I claim is:

1. As new compositions of matter, β-nitroalkyl aralkyl ethers having the structural formula:

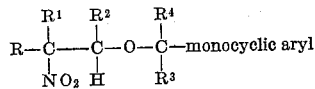

wherein R, R¹, and R² are selected from the group consisting of hydrogen and lower alkyl radicals, and R³ and R⁴ are selected from the group consisting of hydrogen and monocyclic aryl.

2. 2-nitroisobutyl triphenylmethyl ether.
3. 2-nitroisobutyl benzhydryl ether.
4. 2-nitroisobutyl benzyl ether.
5. A process for preparing β-nitroalkyl aralkyl ethers having the structural formula:

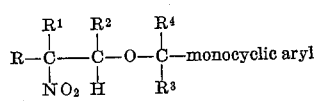

wherein R, R¹, and R² are selected from the group consisting of hydrogen and lower alkyl radicals, and R³ and R⁴ are selected from the group consisting of hydrogen and monocyclic aryl, which comprises heating in the presence of a strong acid catalyst a mixture of a saturated aliphatic mononitro alcohol having the following structural formula:

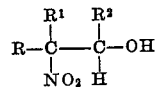

wherein R, R¹, and R² are selected from the group consisting of hydrogen and lower alkyl radicals, an aralkyl compound having the formula:

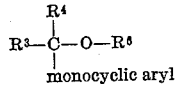

wherein R³ and R⁴ are selected from the group consisting of hydrogen and aryl, and R⁶ is a member selected from the group consisting of hydrogen and methyl.

6. A process for preparing β-nitroalkyl aralkyl ethers having the structural formula:

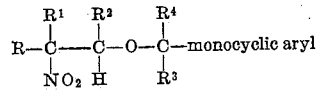

wherein R, R¹, and R² are selected from the group consisting of hydrogen and lower alkyl radicals, and R³ and R⁴ are selected from the group consisting of hydrogen and monocyclic aryl, which comprises heating in the presence of a strong acid catalyst a mixture of a liquid which is inert under the conditions of the reaction and which forms a binary azeotrope with a material selected from the group consisting of methyl alcohol and water boiling below the boiling point of the ether being formed, a saturated aliphatic mononitro alcohol, having the following structural formula

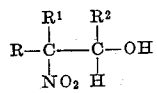

wherein R, R¹, and R² are selected from the group consisting of hydrogen and lower alkyl radicals, an aralkyl compound having the formula:

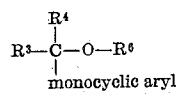

wherein R³ and R⁴ are selected from the group consisting of hydrogen and monocyclic aryl, and R⁶ is a member selected from the group consisting of hydrogen and methyl, removing the member selected from the group consisting of water and methyl alcohol formed during the reaction and recovering the β-nitroalkyl aralkyl ether.

7. A process for the production of 2-nitroisobutyl triphenylmethyl ether which comprises heating in the presence of p-toluenesulfonic acid a mixture of 2-nitro-2-methyl-1-propanol, methyl triphenylmethyl ether, and benzene, removing the methyl alcohol formed during the reaction and recovering the 2-nitroisobutyl triphenyl-methyl ether.

8. A process for the production of 2-nitroisobutyl benzhydryl ether which comprises heating in the presence of p-toluenesulfonic acid a mixture consisting of 2-nitro-2-methyl-1-propanol, benzhydrol, and benzene, removing the water formed during the reaction at a constant boiling mixture with the benzene, and recovering the 2-nitroisobutyl benzhydryl ether.

9. A process for the production of 2-nitroisobutyl benzyl ether which comprises heating in the presence of p-toluenesulfonic acid a mixture of 2-nitro-2-methyl-1-propanol, benzyl methyl ether, and benzene, removing the methanol formed during the reaction and recovering the 2-nitroisobutyl benzyl ether.

MURRAY SENKUS.

REFERENCES CITED

The following references are of record in the file of this patent:

UNITED STATES PATENTS

| Number | Name | Date |
|---|---|---|
| 1,868,076 | Ricard | July 19, 1932 |
| 2,151,769 | Humphrey | Mar. 28, 1939 |
| 2,370,540 | Hodge | Feb. 27, 1945 |
| 2,391,815 | Bahner | Dec. 25, 1945 |
| 2,393,000 | Seeger | Jan. 15, 1946 |
| 2,393,611 | Brunson | Jan. 29, 1946 |

OTHER REFERENCES

Feiser: "Organic Chemistry," page 32 (1944), Heath & Co.

Beilstein (1): "Handbuch der Organischen Chemie," 4th edition, vol. 6, page 716.

Hilferich et al.: "Berichte der Deut. Chem. Gessel," vol. 56 (1923), page 767.

Nef: "Justus Liebigs Annalen der Chemie," vol. 298, page 255.